United States Patent
Boday et al.

(10) Patent No.: US 10,336,914 B2
(45) Date of Patent: Jul. 2, 2019

(54) HEXAHYDROTRIAZINE HYBRID COATINGS FOR SULFUR CAPTURE

(71) Applicant: International Business Machines Corporation, Armonk, NY (US)

(72) Inventors: Dylan J. Boday, Tucson, AZ (US); Jeannette M. Garcia, San Leandro, CA (US); James L. Hedrick, Pleasanton, CA (US); Jason T. Wertz, Pleasant Valley, NY (US); Rudy J. Wojtecki, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 178 days.

(21) Appl. No.: 14/924,174

(22) Filed: Oct. 27, 2015

(65) Prior Publication Data
US 2017/0114249 A1 Apr. 27, 2017

(51) Int. Cl.
C09D 183/08 (2006.01)
C09D 5/08 (2006.01)
C09D 201/02 (2006.01)
C09D 5/00 (2006.01)

(52) U.S. Cl.
CPC ........... *C09D 201/025* (2013.01); *C09D 5/00* (2013.01)

(58) Field of Classification Search
None
See application file for complete search history.

(56) References Cited

U.S. PATENT DOCUMENTS

| | | | | |
|---|---|---|---|---|
| 4,874,858 A | * | 10/1989 | Magistro | C03C 25/40 544/196 |
| 5,340,897 A | * | 8/1994 | Loiselle | C08K 5/5419 525/477 |
| 5,347,004 A | | 9/1994 | Rivers et al. | |
| 5,750,606 A | * | 5/1998 | Miura | C08K 5/0008 524/106 |
| 7,517,447 B2 | | 4/2009 | Gatlin | |
| 8,931,234 B2 | | 1/2015 | Stork | |
| 2003/0194550 A1 | * | 10/2003 | Perrine | C08K 9/06 428/331 |

(Continued)

FOREIGN PATENT DOCUMENTS

CN 101998985 A 3/2011
DE 1951905 A1 * 4/1971 ............ E05D 7/085

(Continued)

OTHER PUBLICATIONS

English machine translation of DE1951905 (1971).*

(Continued)

*Primary Examiner* — Kenneth J Stachel
(74) *Attorney, Agent, or Firm* — Patterson + Sheridan, LLP

(57) ABSTRACT

Methods and compositions related to chemically active hexahydrotriazine inorganic-organic hybrid coatings are described. The coatings have affinity for sulfur compounds, and thus may bind or capture sulfur containing contaminants and gases. The coatings have organosilicon containing functional groups and segments, and may also contain silica particles, which cumulatively enhances adhesion, abrasion resistance and further provides steric barriers to gaseous diffusion. The coatings have utility as protective barrier coatings in the field of electronics.

16 Claims, 3 Drawing Sheets

(56) References Cited

U.S. PATENT DOCUMENTS

2005/0266248 A1* 12/2005 Millero ............... C09D 5/1675
                                                    428/411.1
2015/0034319 A1    2/2015 Taylor
2015/0104579 A1*  4/2015 Hedrick ............... C08G 65/00
                                                    427/385.5

FOREIGN PATENT DOCUMENTS

| GB | 2423516 A | 8/2006 |
| GB | 2423516 B | 9/2010 |
| GB | 2495399 A | 4/2013 |

OTHER PUBLICATIONS

Portable Anal Methods _ Stoichiometry of Reaction for Hexahydrotriazine Based H2S Scavenger Operations Grahame N Taylor Analytical Chemistry 86 pp. 4879-4882 American Chemical Society (2014).*
Science Garcia et al vol. 344 pp. 732-735 May 16, 2014.*

* cited by examiner

HEXAHYDROTRIAZINE HYBRID COATINGS FOR SULFUR CAPTURE

BACKGROUND

The present disclosure describes methods and compositions related to hexahydrotriazine materials for use as barrier coatings in the field of electronics.

Conformal polymer barrier coatings are used to protect electronic articles, such as printed circuit boards and electronic components, from corrosion caused by moisture and other contaminants, including sulfur and its compounds, which can cause short circuits from dendrite growth, electromigration of metal between conductors, and other ill effects. The coatings may also protect from organic solvents, abrasion, vibration, and help maintain the dielectric or insulation resistance of the circuit board. The coatings are applied in thin layers (a few mils or a fraction of a mm) onto electronic articles typically by dipping, spraying or simple flow coating, and increasingly by select coating or robotic dispensing. In some cases, the coating may be vapor deposited from a precursor. Examples of polymeric materials used as conformal coatings are: acrylics, epoxies, urethanes, parylene and polysiloxanes (silicones).

Polysiloxanes are used as conformal coatings for electronic articles because of their thermal resistance, flexibility, vibration damping properties, good adhesion to circuit boards, and water repellency. However, polysiloxanes have limited gas barrier properties, which decreases their ability to protect electronics from corrosive contaminants, such as sulfur and sulfur compounds. This is because of the large free volume inherent in polysiloxanes, which can allow the permeation of gases, such as sulfurous gases, through the material. To overcome this inherent weakness, polysiloxane coatings are applied at thicknesses that are much greater than other conformal coatings, such as about 200 micrometers, which is about 10 times thicker than other conformal coatings. Unfortunately, thick conformal coatings increase material costs and application time, so it would be an advantage to apply a thinner conformal coating that is also an improved barrier to sulfur and sulfur compounds, so as to prevent corrosion and short circuits in sensitive electronic circuits and components.

SUMMARY

This disclosure describes an electronic article comprising a substrate comprising electronic components, and coating disposed over and upon the substrate that contains hexahydrotriazine groups. The coating has a sulfur-reactive surface, and the coating reacts with a sulfur compound to form a sulfur-adduct surface on the coating. The sulfur compounds are selected from the group consisting of: elemental sulfur, inorganic sulfur compounds, hydrogen sulfides, sulfur oxides, organic sulfur compounds, thiols, and alkane thiols; and the sulfur-adduct is selected from the group consisting of monothiazines, dithiazines, thioaminals, and polythioaminals. The sulfur-adduct surface has a thickness from 1 nm to 10 microns.

The coating comprises silicon, and silicon containing groups selected from the group consisting of: organosilicon groups, silane groups, alkoxy silane groups, and polysiloxane groups, and the polysiloxane groups comprise polydimethylsiloxane. The silicon containing groups comprise hexahydrotriazine groups, and the coating comprises particles. The particles are materials selected from the group consisting of: metal oxides, main group oxides, metals, intermetallics, ceramics, carbides, nitrides, and borides, and have average particle diameters that are 10 nm to 10 microns in diameter. The coating of the electronic article may contain particles that are silica particles, and wherein the weight percent of silica particles is from 0.1% to 30% by weight percent of coating. The silica particles are foci for coating crosslinks.

The coating is chemically bonded to the surface of the electronic article by at least one molecular segment comprising a surface-O—Si—R segment, and wherein R is an organic group, and wherein the R group comprises at least one hexahydrotriazine group. The R may be an organic group that is a polymer group, wherein the polymer group repeat unit comprises at least 5 repeat units.

BRIEF DESCRIPTION OF THE SEVERAL VIEWS OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of the disclosure and are therefore not to be considered limiting of its scope, for the disclosure may admit to other equally effective embodiments.

DETAILED DESCRIPTION

Figure 1A:
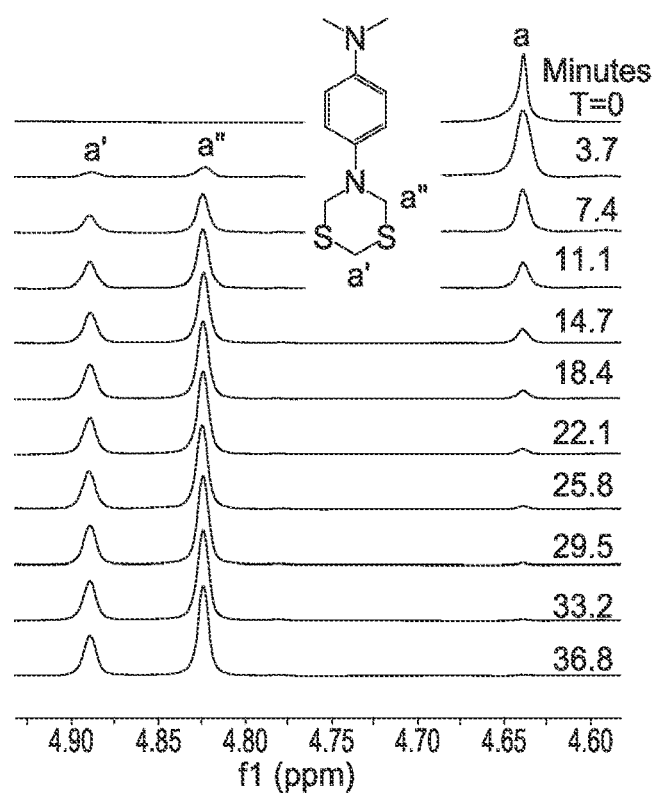
FIG. 1A is a collection of nuclear magnetic resonance (NMR) data showing the progress of a chemical reaction, according to some embodiments of the disclosure.

The present disclosure describes methods and compositions related to barrier coatings containing hexahydrotriazine (HT) groups and/or polyhexahydrotriazines (PHTs) for use in the field of electronics. Hexahydrotriazine (HT or 1,3,5-hexahydro-1,3,5-triazine) groups have the unique ability to scavenge, absorb, react with and/or chemically bind at least one mole of sulfur per HT group. PHTs, which contain sulfur scavenging HT groups, have found use as high strength engineering thermosetting polymers. PHTs also display a unique combination of properties such as high modulus, solvent resistance, and resistance to environmental stress cracking, yet they can be easily recycled by decomposition to monomers in a strong acid. Depending on the application, PHTs, may also be modified to tailor their physical properties, such as glass transition temperature, hardness, modulus, flexibility, elongation, and surface adhesion. This makes PHTs amenable for use as coatings that will react with, and thus chemically bind or capture sulfur from sulfur containing compounds. For example, an HT group may chemically bind at least one mole of sulfur, such as two moles of a sulfur containing compound, such as $H_2S$, and form chemical reaction adducts, or products, as shown in reaction example 1:

Reaction Example 1

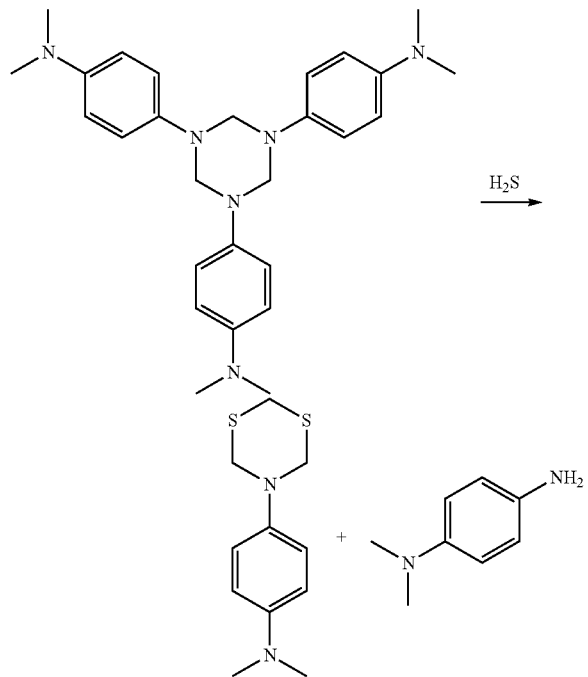

As shown, the products of reaction example 1 may include a chemical compound containing two sulfur atoms, such as a dithioazine group and one or more aminobenzene/aniline molecules. Other sulfur containing reaction products that may be formed as a result of HT group sulfur scavenging/capture include monothiazine group(s) (one mole of sulfur captured) and/or thioaminal groups or a polymer. Generally, the adducts of HT and/or PHT reactions with sulfur compounds may be obtained upon the reaction of an HT moiety with sulfur compounds from the group including, but not restricted to: elemental sulfur, inorganic sulfur compounds, hydrogen sulfides, sulfur oxides, organic sulfur compounds, thiols, and alkane thiols. Referring back to reaction example 1, we note that the lines attached to the nitrogen atoms in the chemical drawing of this disclosure represent methyl groups. In other embodiments the methyl groups may be replaced by other chemical groups and/or molecular segments including oligomeric or polymeric groups.

In one embodiment, a sulfur bearing adduct, such as a dithioazine compound, may be produced from contact with an HT compound in a reaction vessel, including a nuclear magnetic resonance (NMR) tube, as follows: 2.1 g of ZnS may be added to a 100 mL round bottom flask, followed by 20 mL of concentrated HCl. The flask may be equipped with an adapter that allows generated $H_2S$ gas to pass through a syringe. The $H_2S$ thus formed may bubble through 1 mL of $D_{14}$ n-hexane for a period of 5 minutes to afford a saturated stock solution of $H_2S$, for later use in a NMR experiment, that is useful for analyzing the course of a chemical reaction. Another NMR sample may then be prepared using a model hexahydrotriazine compound, shown in reaction example 1 (18 mg in $CDCl_3$ solvent), that will be contacted the $H_2S$ in the $D_{14}$ n-hexane.

Figure 1B:
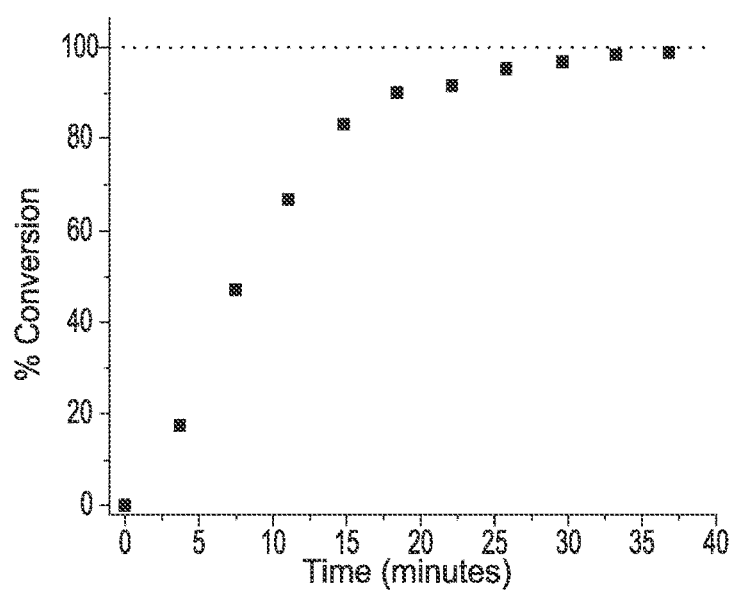
FIG. 1B is a plot derived from the NMR data of FIG. 1A and showing progression of a reaction, according to some embodiments of the disclosure.

Prior to performing the chemical reaction to form the sulfur containing adduct from the aforementioned starting materials, a single 1H-NMR spectrum of the unreacted hexahydrotriazine material may be acquired to identify the protons associated with the carbon atoms of the HT ring before reaction. Then 0.6 mL of the stock solution of $H_2S$ may be added to the NMR tube containing the HT compound, thus producing a solution containing a large excess of $H_2S$ (from about 40% $CDCl_3$ to about 60% $D_{14}$ n-hexane by volume). The 1H-NMR experiments may then be performed, to follow the progress of the reaction, wherein a total of 11 separate spectra may be collected at 3.7 minute intervals. FIG. 1A illustrates the progress of such an 1H-NMR experiment, from about 0 minutes to about 36.8 minutes. The series of spectra show the loss of a proton a, which is the proton bound to the carbon atom of the HT ring, and the emergence of new protons a' and a", bound to the carbon atoms of the dithioazine product. A percent conversion plot over a time period may also be calculated from the associated 1H-NMR spectra, as represented in FIG. 1B, which shows the near quantitative conversion of HT groups to dithioazine groups. In summary, the 1H-NMR experiment illustrates the sulfur scavenging ability of HT moieties when contacted with a sulfur containing compound(s). We note that for the sake of clarity and illustration, only a portion of the 1H-NMR spectra/spectrum is shown in FIG. 1.

In another embodiment, gas phase $H_2S$ may be captured by HT groups. In one example, a PHT polymer coating may adsorb about 90% of $H_2S$ gas (5 ppm in air) in a 1 L container, at a temperature of about 25° C., and over a period of time from about 1 hour to about 5 hours, such as 2 hours. The products of such a surface reaction, such as a PHT polymer surface comprising a mixture of monothioazine and dithioazine groups, may be analyzed by techniques such as NMR, inductively coupled plasma/mass spectroscopy (ICP/MS), time of flight secondary ion spectroscopy (TOF-SIMS, x-ray photoelectron spectroscopy (XPS).

Figure 2:
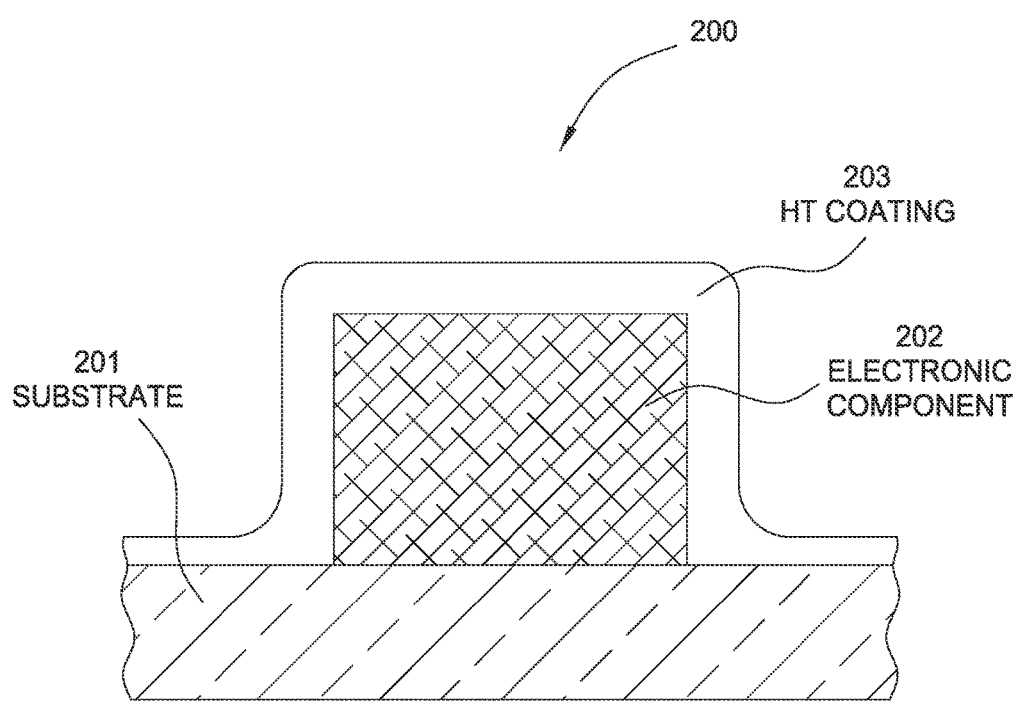
FIG. 2 is a cross-sectional drawing showing an electronic component that is covered by a conformal barrier coating, according to some embodiments of the disclosure.
Figure 3:
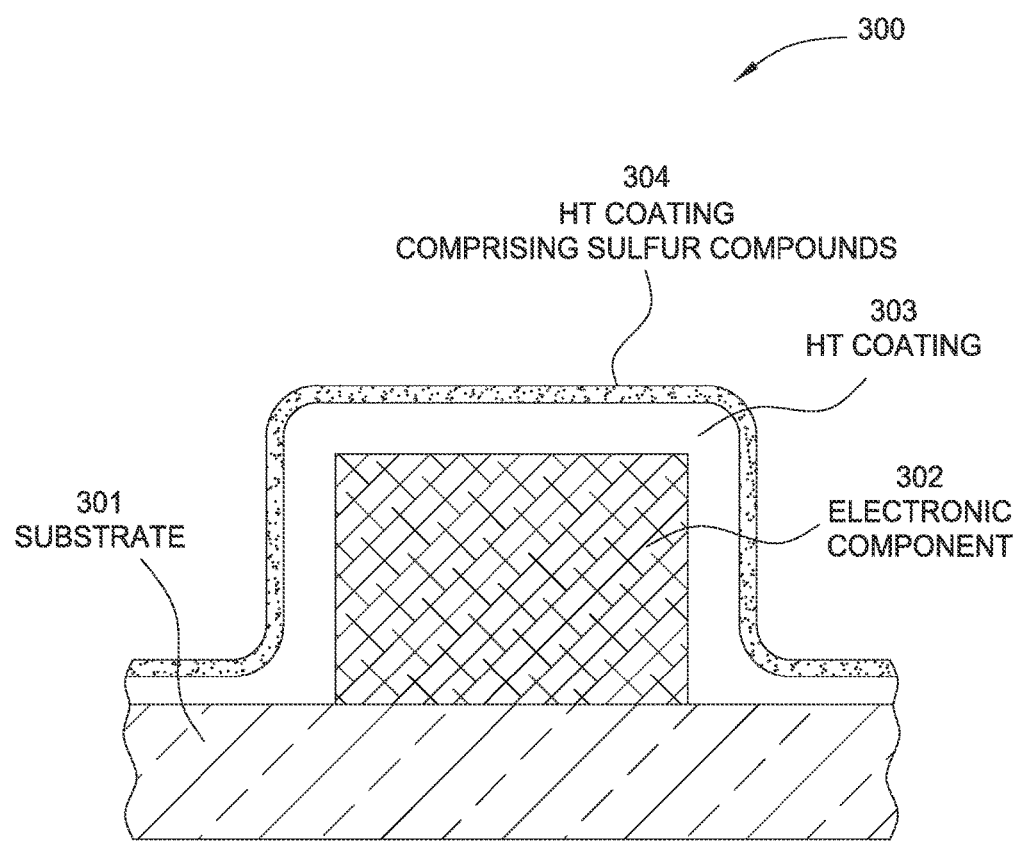
FIG. 3 is a cross-sectional drawing showing an electronic component that is covered by a conformal barrier coating, after exposure to a sulfur compound, according to some embodiments of the disclosure.

In one embodiment, a polymer coating comprising HT groups may be used to protect electronic articles from the corrosive effects of sulfur containing compounds and gases by chemical reaction with the sulfur compound and formation of a non-volatile adduct. For example, a polymer coating containing HT groups may be disposed over and upon an electronic article, such as a printed circuit board or other electronic article(s) that have circuitry and electronic components, such as integrated circuits, transistors, capacitors, resistors, wires and the like. The coating may be applied to an electronic article by coating methods that are familiar to those skilled in the art, including: spray, brush, flow, dip, spin, and automated pattern coating. FIG. 2 is a cross-sectional drawing of such an electronic article 200, that includes a substrate 201, an electronic component 202, and a polymer coating 203 of a first thickness and a first composition that contains HT groups that have not been exposed to or reacted with a sulfur compound. FIG. 3 is a cross-sectional drawing of a similar electronic article 300, after exposure to a sulfur bearing gas, which includes a substrate 301, an electronic component 302, an HT polymer coating of a first thickness and a first composition 303, and a new layer 304, of a second thickness and a second composition. In summary, after exposure to a sulfur containing gas, such as $H_2S$, the HT coating 203 may react with a sulfur compound or compounds, to form a surface or layer of a second thickness and a second composition, 304, that may contain sulfur adducts such as monothioazine groups, dithioazine groups, and unreacted HT groups. The second thickness and composition 304, may be of a thickness from about 1 nm to about 10 microns, depending on parameters such as concentration, the time of exposure, and the permeability of the coating containing HT groups. In further summary, after exposure to a sulfur gas, such as $H_2S$, a multi-layer stack may form, that includes an HT coating 203 of a first layer thickness and a first composition, containing some unreacted HT groups, and a sulfur rich layer 304, of a second thickness and a second composition, that contains captured sulfur in the form of monothioazine and/or dithioazine groups, and unreacted HT groups.

The coating may also have organosilicon groups that are chemically bonded to HT groups. An organosilicon group may contain silicon and heteroatoms other than carbon, such as oxygen, and carbon groups, such as aliphatic or aromatic groups. In one embodiment, the organosilicon groups may be used to anchor or adhere HT materials to surfaces, such as the surfaces of electronic articles and components. The organosilicon groups may also be silane groups, such as alkoxysilane groups. Compounds or materials that contain alkoxysilane groups that bind or "couple" an organic group, such as an HT group to an inorganic surface may also be known as "coupling agents". Other coupling agents that may be useful include titanates and zirconates. For example, the chemical binding, coupling, or attachment point of a HT group to the electronic article or component surface may be due to the chemical reaction of at least one organosilicon group to the surface of the electronic article or component surface. Such chemical reactions, wherein a coupling agent binds to a surface, may include reactions known as sol-gel polymerization, hydrolysis, and condensation reactions. To prepare a new coupling molecule containing organosilicon groups and an HT group that may adhere to an electronic article surface, non-limiting reaction example 2 is presented:

Reaction Example 2

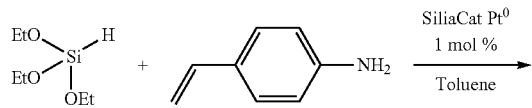

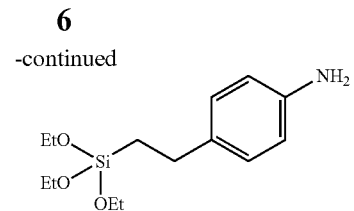

As shown in reaction example 2, an alkoxy silane compound, in this example triethoxysilane, may be contacted with a vinyl aniline/aminobenzene compound, in this example paravinylaniline, so that a hydrosilylation reaction occurs (in the presence of 1 mole percent platinum bearing catalyst) in a non-polar solvent, at a temperature from about 25° C. to about 100° C., for a period from about 0.5 hour to about 2 hours. The product of reaction example 2, 4-(2-(triethoxysilyl)ethyl)aniline, may be used next to form a surface coating that includes HT groups as follows: a) perform a sol-gel polymerization/hydrolysis/condensation reaction with an electronic article surface containing surface hydroxyl groups and oxide groups, to anchor or adhere the 4-(2-(triethoxysilyl)ethyl)aniline compound to the surface, b) contact/react the surface anchored 4-(2-(triethoxysilyl) ethyl)aniline material with 2.5 equivalents of paraformaldehyde in N-methylpyrrolidone (NMP) solvent at a temperature from about 50° C. to about 100° C. to form a hemiaminal group, and c), convert the hemiaminal group to an HT group at a temperature from about 100° C. to about 200° C. and remove the NMP. Such a non-limiting reaction sequence is shown in reaction example 3:

Reaction Example 3

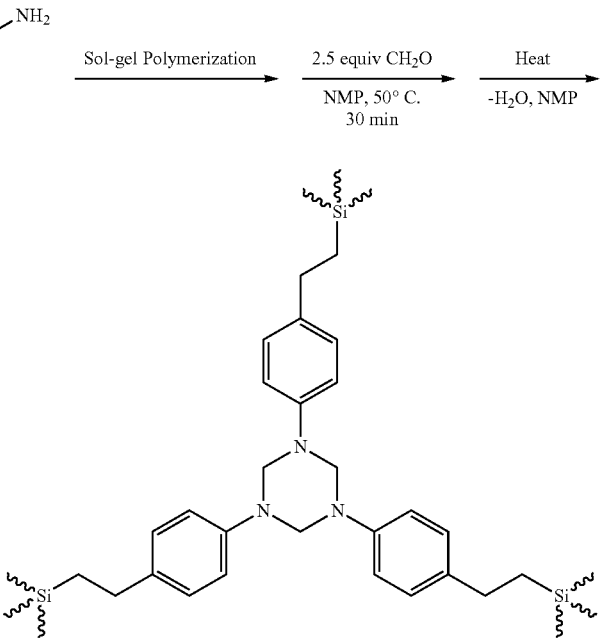

In regards to reaction example 3, the wavy lines represent chemical bonds, or portions of the coating which may bind to and coat a surface, such as an electronic article surface, by a surface-O—Si—R segment, where R is an organic group that has at least one HT group. The coating molecular structure thus formed may contain segments that are monomeric, oligomeric, polymeric and/or mixtures thereof. For example, those skilled in the art may control the thickness, and produce a monolayer that contains at least one molecule of thickness, or, in one embodiment, a polymer containing HT groups is attached to the surface by a surface-O—Si—R' segment, where R' is a PHT. Control of coating thickness and degree of polymerization may be adjusted by the amount of chemical reagents and materials provided by the practitioner. Examples of polar surfaces that may bind to such an HT coating, include, but are not restricted to: metals, transition metals, metal oxides, semi-metals, semi-metals oxides, minerals, glasses, plastics, and plasma treated metals and plastics. We further note that the materials used to prepare and/or synthesize the chemical compounds and materials described herein are available from a number of sources, including Gelest Incorporated of Morrisville, Pa., USA, and Sigma-Aldrich Chemical Company, of St. Louis, Mo., USA.

In further embodiments related to reaction example 3, the final product may be a polymer network that comprises a polysiloxane material chemically bonded to organosilane groups containing HT groups. More specifically, such a coating may be an inorganic-organic hybrid conformal coating, comprising a polysiloxane network that contains chemically bound hexahydrotriazine groups. Such a hybrid coating may also capture or scavenge sulfur and sulfur containing gases, and thus provide an effective barrier to sulfur-bearing contaminants in electronic applications. Polysiloxanes are inorganic-organic polymers that have an inorganic silicon-oxygen backbone chain (—Si—O—Si—) with organic side groups attached to the four-coordinate silicon atoms, and may be represented by the chemical formula [$R_2SiO$]$_n$, where R is an organic group. The organic group may be aliphatic, aromatic, or both, and may further comprise other atoms and/or chemical functionalities that are inorganic. The functionality attached to the silicon atoms may be charged or neutral. Alternatively, one or both of the R groups may be substituted with R" (double prime) groups, wherein R" may represent other chemical moieties, including, but not restricted to the halogens, hydrogen, and other main group elements.

In other embodiments, a sulfur binding or sulfur scavenging inorganic-organic hybrid coating may contain HT groups, polysiloxane groups, and silica particles and/or combinations and mixtures thereof. For example, silica particles may be first functionalized with 4-(2-(triethoxysilyl)ethyl)aniline as illustrated in reaction example 4:

Reaction Example 4

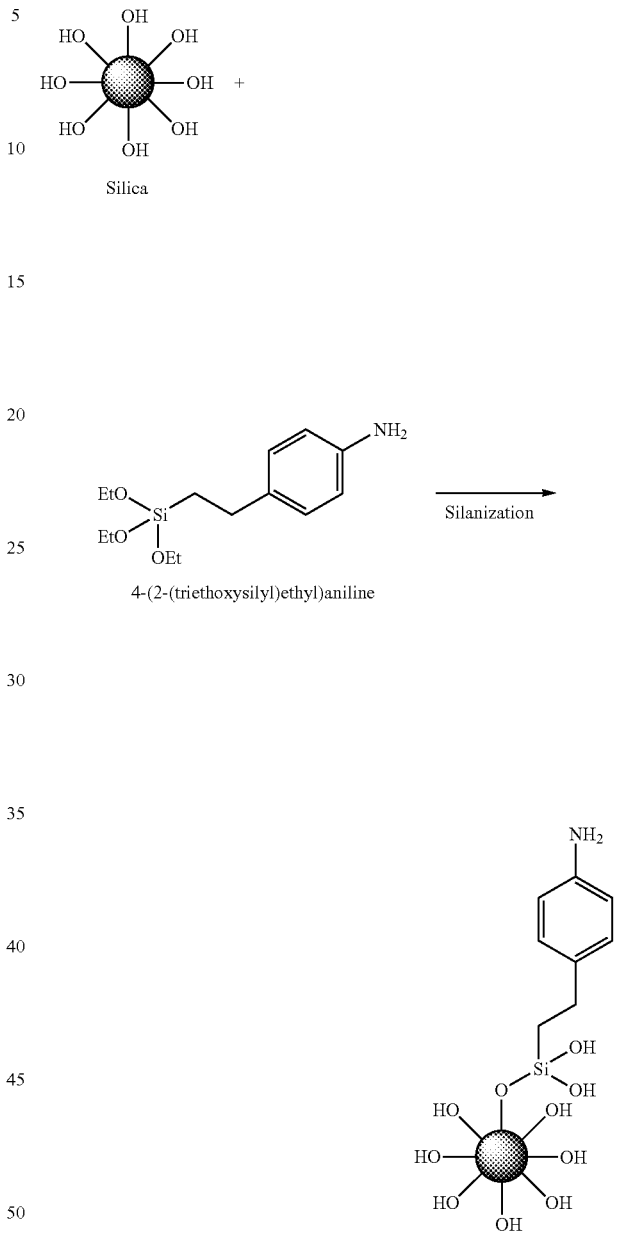

At least one 4-(2-(triethoxysilyl)ethyl)aniline group may be bound to a silica particle as shown, or a particle may have multiple silicon containing aniline/aminobenzene groups bound to its surface via a surface-O—Si—R segment. Herein, R represents an organic group that has an aminobenzene group, and the aminobenzene group may be a precursor for the subsequent formation at least one HT group. After the silica particle is functionalized with the silicon containing aniline/aminobenzene groups, the particle may then be converted to an inorganic-organic hybrid HT coating, which may be a polymeric network, by reaction with paraformaldehyde, as illustrated in reaction example 5:

Reaction Example 5

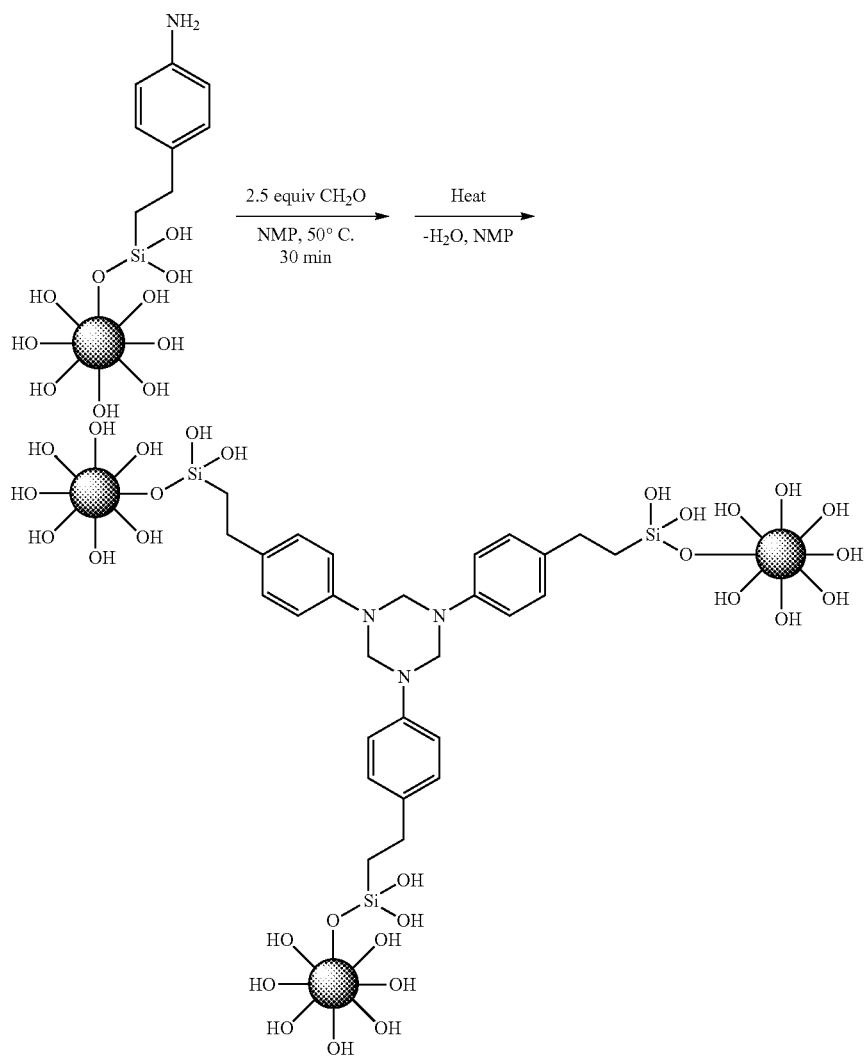

Silica particles that are integrated in such a HT hybrid coating provide multiple advantages: foci for crosslinking which may lead to higher modulus depending on percent loading, increased abrasion resistance, and a further affinity for a polar surface of an electronic article via hydrogen bonding. In one embodiment, the percent by weight of silica particles in such a coating may be from about 0.1% to about 30% by weight, such as 10% by weight, and by which may increase the Shore hardness and modulus of such a coating by as much as 50%.

A further benefit of silica particles in the coatings of this disclosure is that the particles may also serve as physical blocking sites that retard or slow contaminant gas ingress through the coating, and thus into an electronic article, by way of a tortuous path. Therefore, the coatings comprising both HT moieties and silica particles may block or slow permeation of contaminant gases by two mechanisms: 1), chemical reaction and adduct formation when contacted with sulfur compounds, and 2), slowing of gas permeation via a tortuous path. More specifically, by the processes described above, gases permeate coatings by a solubility/diffusion mechanism, where the rate of gas permeation is directly proportional to the product of solubility of the gas, and the rate of diffusion of the dissolved gas ($P=S \cdot D$). The permeability coefficient (P) is a parameter defined as the transport flux of a gas (rate of gas permeation per unit area), per unit driving force, per unit membrane thickness. Temperature also affects coating permeability at elevated temperature applications, such as those coatings used to protect electronic articles. The Arrhenius equation, $P=P_o e^{(-E/RT)}$, where P is the permeability, $P_o$ is the permeability constant, E is the activation energy, R is the gas constant, and T is the temperature, relates temperature to permeability. Permeation rates of gases and permeation coefficients may be measured by a number of methods including coulometric (ASTM D 3895), manometric (ASTM D 1434), and carrier gas (ISO 15105-1). Instruments that measure permeation and permeation testing services are provided by companies such as Mocon Inc., of Minneapolis, Minn., USA.

The HT conformal coatings described herein may be thinner than other conformal coatings, due to improved barrier properties resulting from both the sulfur adduct formation and the blocking action of crosslinked silica particles. Additionally, the solubility and diffusion factors governing permeation may be adjusted to enhance the barrier properties of the PHT coatings by modifying the coating chemical polarity, density, and crosslink density. This may be achieved by changing the R groups of the PHT polymer and/or the organosilicon groups, which may be polysiloxane groups and copolymers. For example, if the R groups are aromatic rings and/or other bulky structures, permeant diffusion may be slowed by local crystallite formation and other steric effects.

In one embodiment, improved barrier properties are realized after initial exposure of an HT coating to a sulfur containing compound or gas. This is because the coating may form a new passivating surface layer and composition that contains the chemical reaction adducts from contact of the HT groups with a sulfurous gas. The new passivated surface and composition, such as that represented by 304 in FIG. 3, disposed over and upon an underlying unreacted or partially reacted HT coating layer, such as that represented by 303 in FIG. 3, may have reduced solubility or affinity for contaminant gases, and thus a reduced entropy gradient for sulfurous gases to traverse through the coating.

While the foregoing is directed to embodiments of the present disclosure, other and further embodiments of the disclosure may be devised without departing from the basic scope thereof, and the scope thereof is determined by the claims that follow.

What is claimed is:

1. An electronic article, comprising:
a substrate comprising electronic components; and
a coating disposed over and upon the substrate, wherein the coating contains polyhexahydrotriazine bonded to silicon containing groups or hexahydrotriazine bonded to silicon containing groups, wherein the silicon containing groups are selected from the group consisting of organosilicon groups, silane groups, alkoxy silane groups, and polysiloxane groups.

2. The electronic article of claim 1, wherein the coating has a sulfur-reactive surface.

3. The electronic article of claim 2, wherein the coating reacts with a sulfur compound to form a sulfur-adduct surface on the coating.

4. The electronic article of claim 3, wherein the sulfur compound is selected from the group consisting of: elemental sulfur, inorganic sulfur compounds, hydrogen sulfides, sulfur oxides, organic sulfur compounds, thiols, and alkane thiols.

5. The electronic article of claim 3, wherein a sulfur-adduct of the sulfur-adduct surface is selected from the group consisting of monothiazines, dithiazines, thioaminals, and polythioaminals.

6. The electronic article of claim 3, wherein the sulfur-adduct surface has a thickness from 1 nm to 10 microns.

7. The electronic article of claim 1, wherein the polysiloxane groups comprise polydimethylsiloxane.

8. The electronic article of claim 1, wherein the coating comprises particles.

9. The electronic article of claim 8, wherein the coating comprises particles selected from the group consisting of: metal oxides, metals, intermetallics, ceramics, carbides, nitrides, and borides.

10. The electronic article of claim 9, wherein an average diameter of the particles is 10 nm to 10 microns.

11. The electronic article of claim 9, wherein the particles are silica particles.

12. The electronic article of claim 11, wherein a weight percent of the silica particles is from 0.1% to 30% by weight percent of coating.

13. The electronic article of claim 11, wherein the silica particles are foci for coating crosslinks.

14. The electronic article of claim 1, wherein the coating is chemically bonded to the substrate.

15. The electronic article of claim 14, wherein the coating is chemically bonded to the substrate by at least one molecular segment comprising a surface-O—Si—R segment, wherein R is an organic group that is a polymer group, and wherein the polymer group has a polymer repeat unit comprising at least 5 repeat units and at least one hexahydrotriazine.

16. The electronic article of claim 14, wherein the coating is chemically bonded to the substrate by at least one of the silicon containing groups.

* * * * *